Oct. 18, 1949. W. J. COTTON 2,485,480
ELECTROCHEMICAL PRODUCTION OF NITROGEN OXIDE
Filed June 17, 1949 4 Sheets-Sheet 1
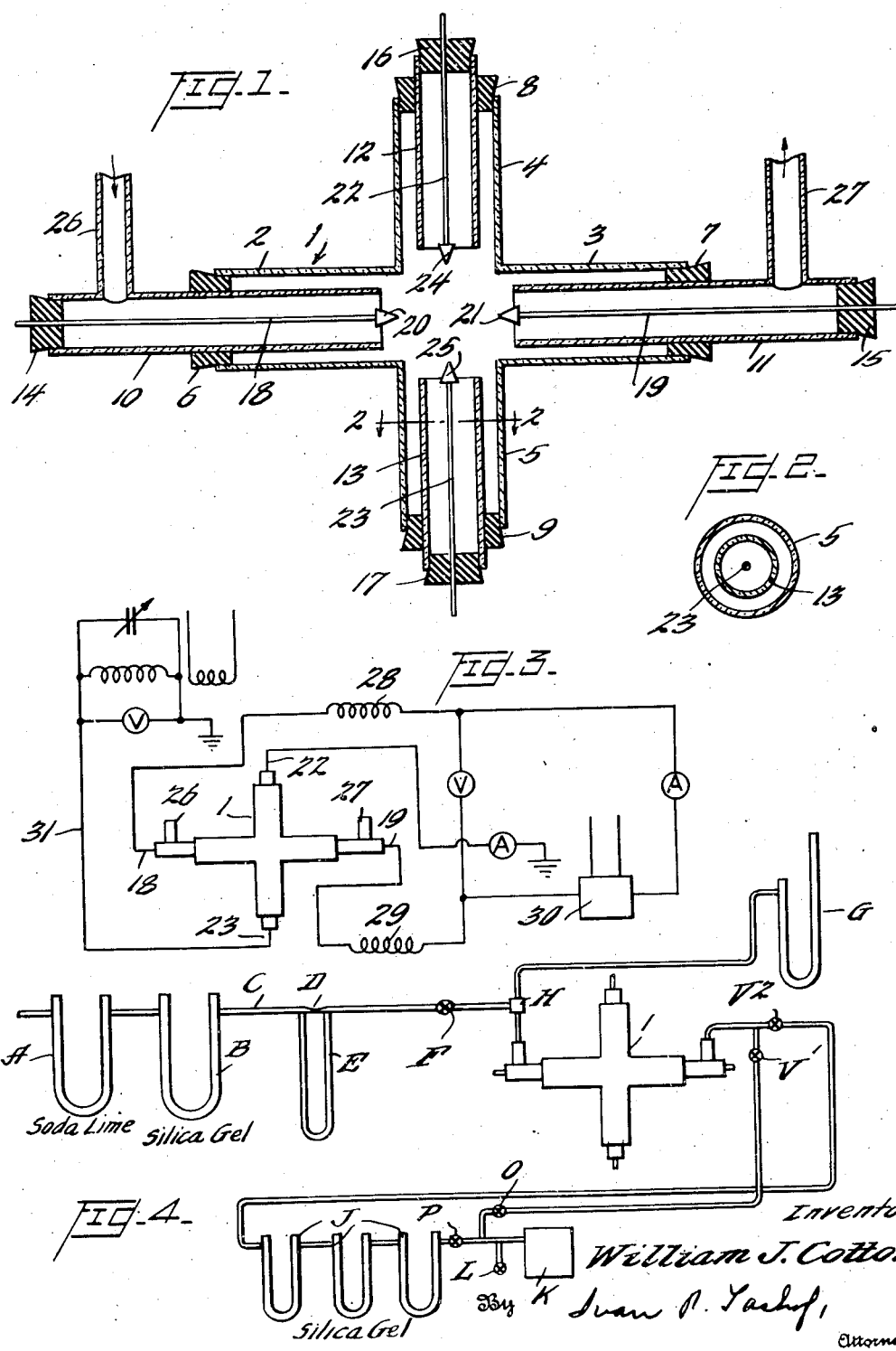

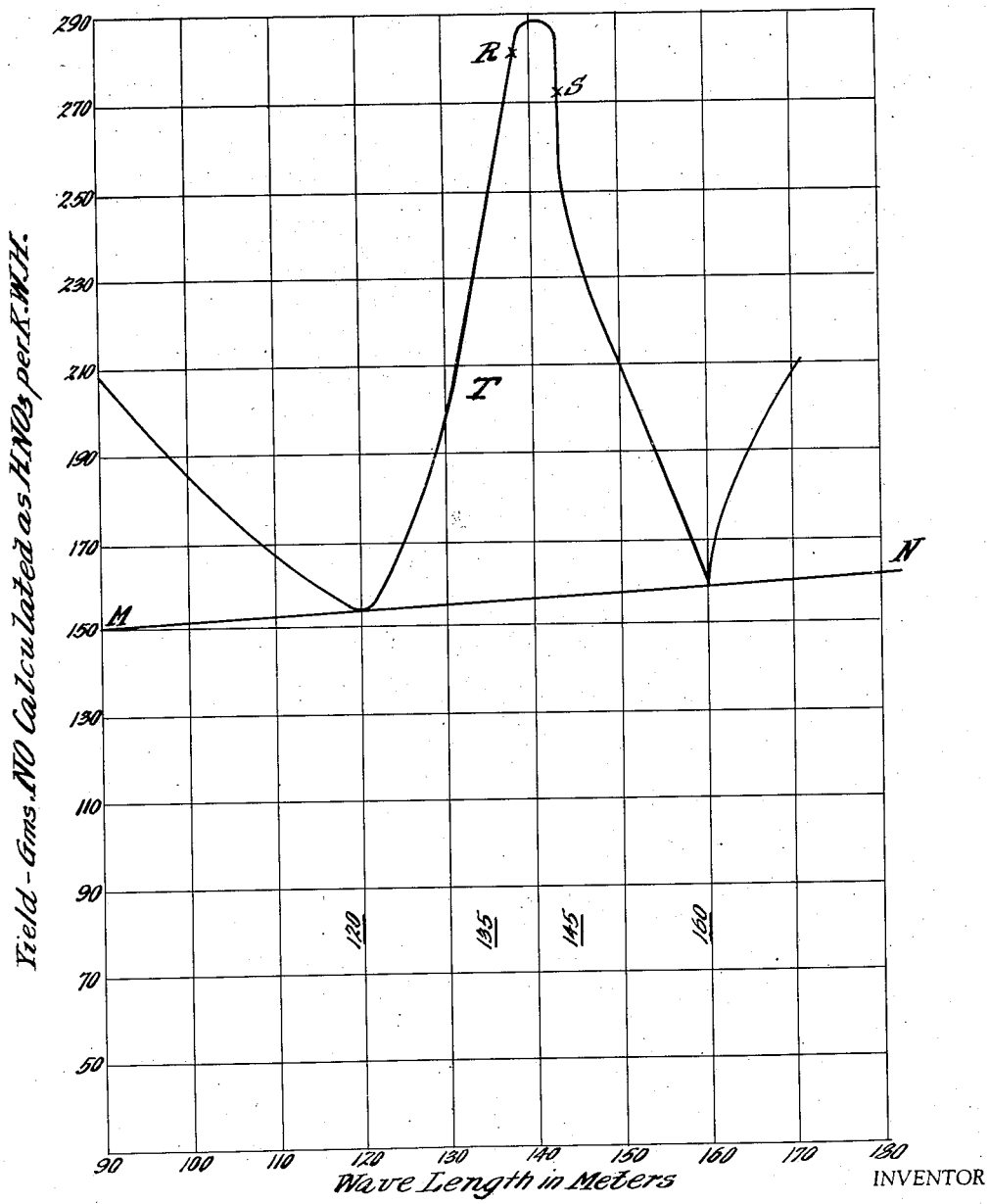

Oct. 18, 1949.  W. J. COTTON  2,485,480
ELECTROCHEMICAL PRODUCTION OF NITROGEN OXIDE
Filed June 17, 1949  4 Sheets-Sheet 3

Inventor
William J. Cotton,
By Ivan P. Dashy,
Attorney

Oct. 18, 1949.   W. J. COTTON   2,485,480
ELECTROCHEMICAL PRODUCTION OF NITROGEN OXIDE
Filed June 17, 1949   4 Sheets-Sheet 4
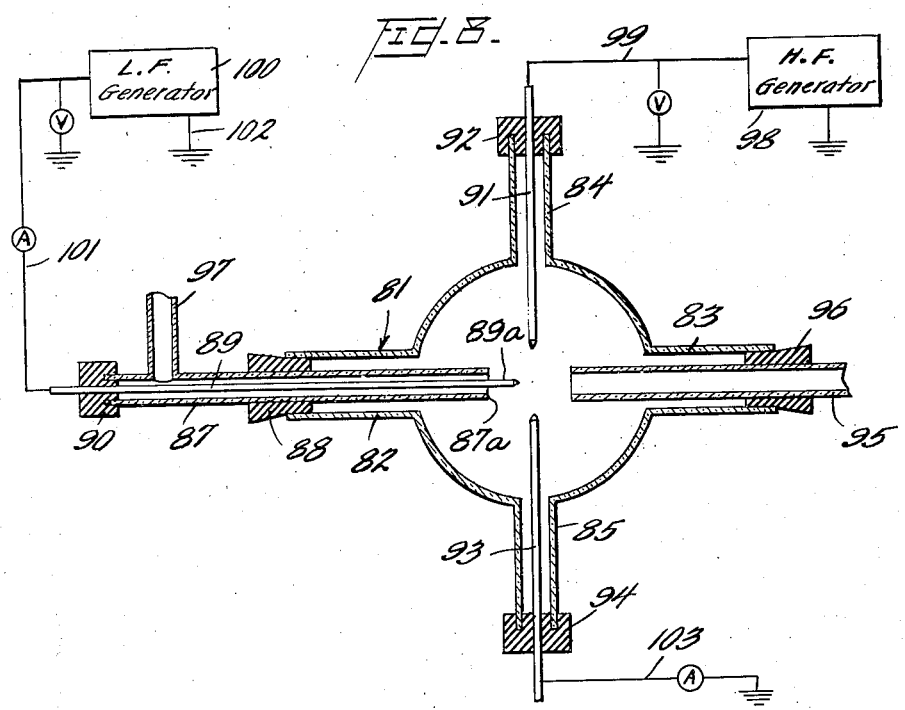
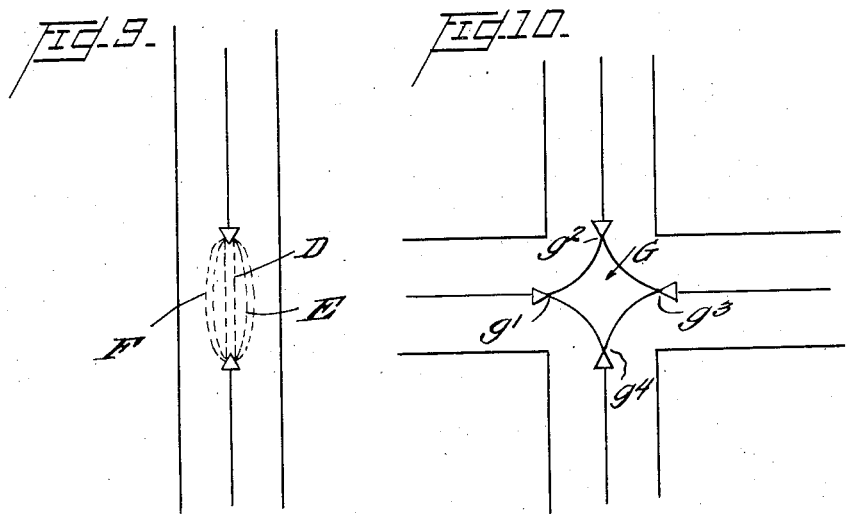
INVENTOR
William J. Cotton
BY
ATTORNEY Patented Oct. 18, 1949

2,485,480

UNITED STATES PATENT OFFICE 2,485,480

ELECTROCHEMICAL PRODUCTION OF NITROGEN OXIDE

William J. Cotton, Butler, Pa., assignor to Koppers Company, Inc., Pittsburgh, Pa., a corporation of Delaware Application June 17, 1949, Serial No. 99,815
In Canada June 11, 1945

15 Claims. (Cl. 204—179)

This invention relates to the production of chemical entities by subjecting gaseous material to the action of a plurality of cyclic electrical discharges of substantially different frequencies, one of said frequencies being preferably a radio frequency.

In the preferred form of the invention the chemical material is subjected to the action of crossed electrical discharges generated by separate, crossed, cyclic energy.

The primary object of the present invention is to electrochemically react gaseous materials to produce therefrom, in the presence of crossed cyclic electrical energy, optimum yields of transformation product or products. Other experimental and auxiliary objects will appear as the present invention is disclosed.

In accordance with the present invention, a method is provided for effecting, electrochemically, transformation of gaseous material, said method comprising introducing the material into a reactor provided with crossed electrodes, and subjecting said materials to the action of a plurality of crossed electrical discharges, each of which is generated by cyclic electrical energy. The cyclic electrical energy preferably is generated by an alternating current. However, a pulsating current may be used. Means other than an alternating current are known by which may be provided a pulsating cyclic current and said pulsating cyclic current may be crossed by a current of any of the frequencies set forth herein. For the purpose of carrying out the objectives of this invention, all means for generating a cyclic or pulsating electrical discharge are included.

It has been discovered that certain wave lengths produce peak yields of electrically transformed products, and in accordance with the present invention each of the crossed electrical discharges is generated by a separate cyclic electrical energy, one of said cyclic electrical energies having a wave length producing peak yields of the electrical transformed products. In one form of the invention, the crossed electrical discharges are generated by cyclic electrical energies of substantially different frequencies; and in one variation thereof one of said frequencies is a frequency which produces peak yields of the electrically transformed product.

The principle of crossed discharges, as broadly herein disclosed, may be applied to effect a number of chemical reactions, including chemical combination, polymerization, dehydrogenation, oxidation and the like.

It is a primary object of the present invention to produce nitrogen oxide by electrochemically transforming a gaseous medium consisting principally of oxygen gas and nitrogen gas. This medium may be introduced into a gas discharge apparatus including a reactor having disposed therein a plurality of spaced metallic electrodes adapted to supply the reactor with a plurality of cyclic electrical discharges having different energy quanta, said electrodes being selected from the group consisting of a metal-containing material in which copper predominates, and a metal-containing material in which nickel predominates. Thereafter the gaseous medium is subjected, in the presence of said electrodes to the action of a composite electrical discharge, preferably luminous in character, said discharge being produced by the intersection of two separate cyclic electrical discharges of different energy quanta, one of said discharges being generated by cyclic energy quantum equivalent to a sinusoidal frequency between about 2.50 mc. (120 meters) and about 1.875 mc. (160 meters). Desirably, the reaction is carried out at approximately minimum sustaining energy. The crossing of the discharges primarily functions to increase the yield and the increase in yield due to crossing become significantly apparent when the difference between the crossed electrical discharges is at least 65,000 cycles per second. At a difference of 100,000 cycles per second, the discharge is still greater and when there is a difference between the crossed discharges of 200,000 cycles per second, there is a still further increase in the yield. In the preferred form of the invention, one of the discharges is generated by cyclic energy quantum equivalent to a sinusoidal frequency between about 2.22 mc. (135 meters) and about 2.07 mc. (145 meters).

It is a special object of the present invention to produce chemical entities by subjecting them to the action of crossed electrical discharges, the latter being generated by crossed electrodes, at least one pair of the electrodes or electrode terminals being provided with a lithium component functioning to increase the yield of the electrochemically transformed product. A single electrode or electrode terminal, or a plurality of electrodes or electrode terminals, may comprise a copper-lithium alloy in which the copper predominates. Preferably, the electrode terminal or electrode surface contains at least from 1% to 5% of lithium, or it may be composed of an alloy of copper containing 2% to 4% of lithium. The alloy may comprise 4% lithium and the balance copper, or 0.2% to 4% of lithium, the balance being copper or brass. Other alloys of metals with lithium, as, for example, a nickel-lithium alloy, may be used for a single electrode terminal or a single set of electrode terminals or for both sets of electrode terminals.

In the specific form of the present invention, there is provided a method of producing nitrogen oxide comprising introducing into a reactor provided with pairs of electrodes whose discharges axes cross each other, and at least one pair of electrodes which has as its operative electrode portion an alloy containing a substantial amount of lithium, as, for example, a copper alloy, containing 1% to 5% of lithium, and preferably 2% to 4% lithium, and preferably about 2% of lithium; a nitrogen-and-oxygen-containing medium adapted to produce nitrogen oxide upon treatment with crossed electrical discharges, and thereafter subjecting said medium to the action of a plurality of crossed electrical discharges, each of which is separately generated by electrically developed energy, the generation of said crossed discharges occuring in the presence of the lithium alloy, as, for example, a copper-lithium alloy, whereby the yield of nitrogen oxide is greatly increased.

While one of the said crossed discharges may be generated by a low frequency current, as, for example, 60 to 10,000 cycles, and the other generated by a high frequency current, as, for example, that of radio frequency, or any cyclic current having a frequency of about 250,000 cycles per second, it is preferred that each of said electrical discharges be generated by separate cyclic discharges differing in energy quantum, at least one of said discharges being generated by a cyclic energy quantum capable of producing peak yields of nitrogen oxide in the presence of the copper-lithium alloy electrodes.

It has been discovered that when a nitrogen-and-oxygen-containing material such as air is subjected to the action of a plurality of crossed discharges, at least one of said discharges being generated by a cyclic energy quantum equivalent to a sinusoidal frequency about 2.50 mc. (120 meters) and about 1.875 mc. (160 meters), peak yields of nitric oxide are produced. This peak wave band, while varying broadly from about 2.50 mc. (120 meters) to about 1.875 mc. (160 meters), more specifically varies from about 2.22 mc. (135 meters) to 2.07 mc. (145 meters) for optimum yields.

The present invention will be disclosed in connection with the accompanying drawings, in which Fig. 1 is a cross-sectional view of a reactor apparatus capable of generating crossed discharges of the character herein described;

Fig. 2 is a transverse cross-sectional view taken on the line 2—2 looking in the direction of the arrows in Fig. 1;

Fig. 3 diagrammatically sets forth the connection of the high frequency electrodes to the generator and tank circuits and the low frequency electrodes to the source of low frequency energy;

Fig. 4 is a diagrammatical representation of an apparatus for drying the air prior to its introduction into the reactor, and for absorbing the nitric oxide content of the exit reaction gases;

Fig. 5 is a graph depicting the results obtained when using the reactor set forth in Fig. 1. The abscissa indicates wave lengths, lambda, in meters, and the ordinate indicates the yield in grams of nitric oxide calculated as grams of nitric acid per kilowatt hour;

Figure 6:
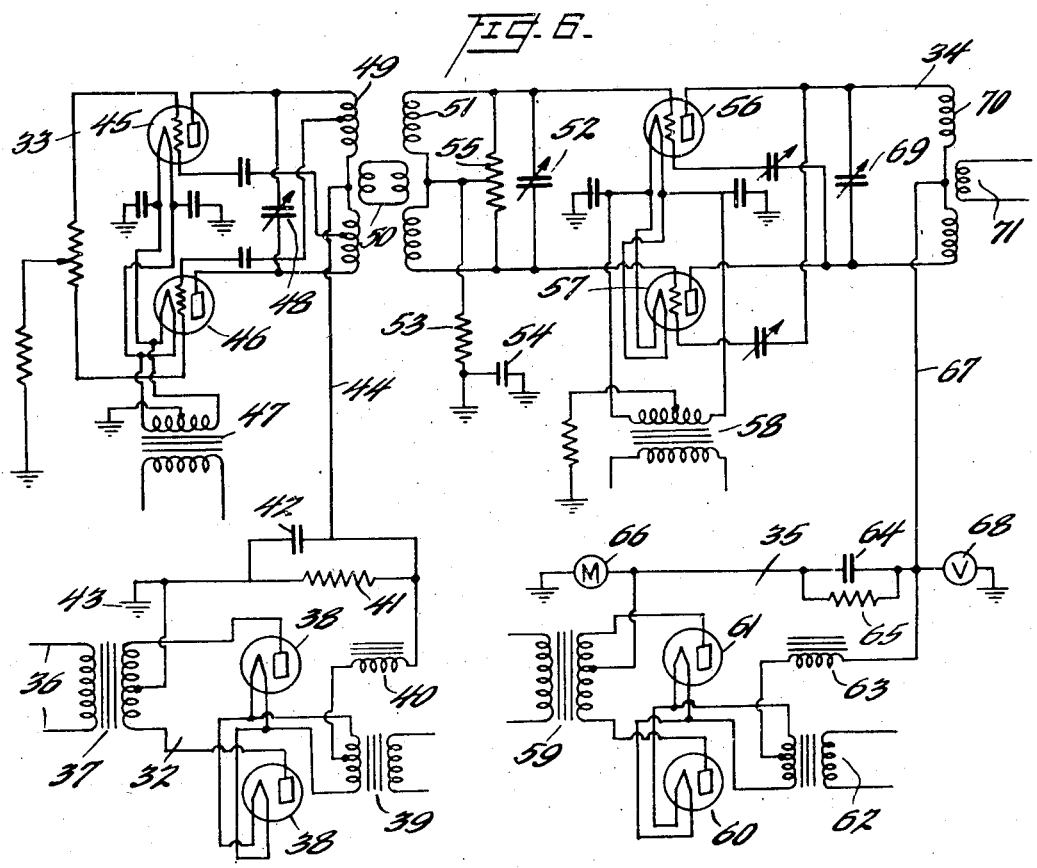
Figure 7:
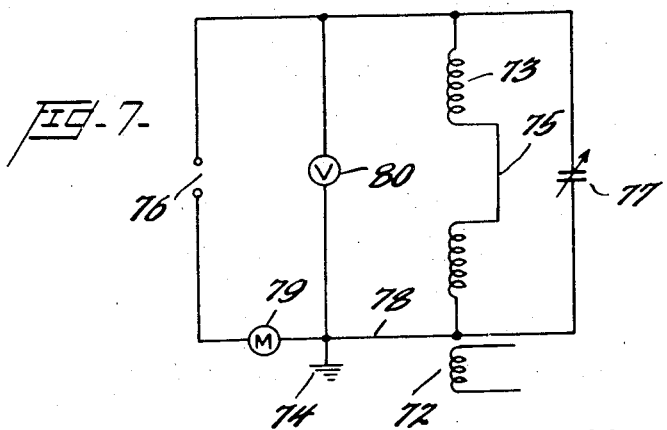

Fig. 6 sets forth the hook-up of the high frequency generator unit used for producing the high frequency energy supplied to the tank circuit which connects the generator with the reactor;

Fig. 7 sets forth the tank circuit used in conveying electrical energy from the generator to the reactor; and Fig. 8 is a cross-sectional view of an alternative reactor apparatus capable of generating crossed discharges of the character herein described;

Fig. 9 diagrammatically depicts the volume and shape of D, a low frequency discharge; E a high frequency discharge corresponding in frequency to a base line frequency; and F a high frequency discharge corresponding in frequency to a critical frequency;

Fig. 10 diagrammatically displays the shape and volume of the cyclic electrical discharge emanating from electrodes positioned at an angle to one another and preferably at an angle from 45° to 90°. The discharges which emanate from the electrodes intersect and merge as they leave the electrodes to produce an electrical discharge having approximately the shape and volume shown.

The reactor apparatus shown in Fig. 1 comprises a hollow reactor vessel 1 made of nonconducting or insulating material, such as ceramic material, including glass, and preferably a high melting glass as exemplified by borosilicate glass, commonly sold under the brand name "Pyrex." The reactor is provided with what are herein termed "leg members" 2, 3, 4, and 5 provided respectively with apertured insulating closure members 6, 7, 8, and 9, each of said closure members having mounted therein sheath members 10, 11, 12, and 13 respectively. Each of said sheath members at their respective outer ends are closed by apertured closure members 14, 15, 16, and 17 respectively. Passing through the sheath members 10 and 11 and mounted in the end closures 14 and 15 respectively are low frequency electrodes 18 and 19 provided with alloy electrode terminals 20 and 21 consisting of a copper-containing alloy, as, for example, a copper-lithium alloy or a nickel-lithium alloy, or alloys of lithium with other metals. Certain runs are herein set forth, and in these runs the reactor was equipped with electrodes, the operative electrode portions of which, namely, the electrode terminals, comprised an alloy of copper and lithium, the latter being present in the amount of about 2%. Especially good results may also be obtained using a copper-lithium alloy containing 2% of lithium. In general, the lithium content may vary between 0.0% and 4%, or between 0.5% and 4.0%.

Very satisfactory results may be obtained by having the electrodes 18 and 19 and terminals 20 and 21 integral with each other and made of copper-lithium alloy wire, or in the form of a copper-lithium alloy rod. However, it is within the province of the present invention to make electrode terminals of any of the electrodes herein set forth removable to thereby provide for the replacement of burnt-out electrodes terminals with new terminals. Passing through the sheath members 12 and 13 and mounted in the closure members 8 and 9 respectively are high frequency electrodes 22 and 23, said electrodes being provided with copper-lithium alloy terminal members 24 and 25 respectively, said electrode terminals or tip members being preferably pointed. These low frequency electrodes, together with their accompanying electrode terminals, may be in the form of integral copper-lithium alloy wire or rod, pointed at its inner end to thereby provide the copper-lithium electrode point. The reactor is provided with an inlet member 26 and an exit member 27.

The electrode 23 serves as a hot electrode in the tank circuit herein set forth, while the electrode 22 passes to ground via a milliammeter, as shown in Fig. 3. The low frequency electrodes 18 and 19 connect with the terminals of the high voltage transformer 30 yielding 60 cycles, and in said circuit a high voltage voltmeter and milliammeter are placed in the usual manner. The high voltage transformer 30 is protected against possible shorts from the high frequency circuit in the reactor by inserting appropriate choke coils 28 and 29 between the low frequency electrodes and their connection to the high voltage low frequency circuit as shown in Fig. 3.

The high frequency electrode 23 is connected to lead 31, said lead and electrode being an integral part of the tank circuit shown in Fig. 3 and more specifically in Fig. 7.

The gaseous component to be treated in the reactor set forth in Fig. 1 or Fig. 8, after being dried in the apparatus set forth in Fig. 4 in the manner hereinafter described, enters the reactor Fig. 1 through the inlet member 26, passes through the sheath member 10 around the electrode terminal and through the composite crossed discharge. The reaction product passes through the sheath 11 and leaves the latter by means of the exit conduit 27. The reaction product passes through a medium for extracting its nitric oxide content, the precise method of extraction being hereinafter set forth in connection with the description of Fig. 4.

While, as stated, it is preferred to have the electrode terminals pointed, it is within the province of the present invention to use buttons, nodules, globules, or to have the electrode terminals in any other shape hitherto used in the treatment or electrochemical transformation of chemical products. The sheath members may, under some circumstances, be omitted, but it is highly desirable to retain them in order to force the flow of a gaseous medium being subjected to the action of the crossed discharge in and around the electrode terminals. Further, it may be stated that the sheath members function to a substantial extent to protect the outer vessel from the effect of heat which may be produced during the course of the reaction in the reactor. It is preferred that the electrode terminals 20, 21, 24 and 25 project beyond the interior ends of the sheath members in order to avoid undue heating which may induce generations of sodium and other undesirable ions which tend to generate side reactions.

The following is a specific example, identified as Example I, illustrating the production of nitric oxide from atmospheric air using the reactor set forth in Fig. 1, there being produced peak yields of nitric oxide under the specific operating conditions.

The diameter of each leg of the reactor vessel is 32 mm. and the inner sheaths are 23 mm. in diameter. The overall length of the reactor 1 is approximately 10 inches. In starting the apparatus, the flow of dried air is initiated through the inlet tube 26, said air passing through the reactor legs at the rate of approximately 510 cc. per minute under standard conditions of temperature and pressure. The pressure within the reactor is maintained at approximately 335 mm. mercury pressure. There is applied to the high frequency electrode terminals 24 and 25 high frequency energy having a potential voltage, before striking, of approximately 1800, said voltage dropping immediately on striking the discharge to 300 volts, with a corresponding current of 16 milliamperes. The high frequency energy is applied at a frequency of 2.17 mc. (138.2 meters). The high frequency gap between electrode terminals 24 and 25 is 10 mm.; and the low frequency gap between electrode terminals 20 and 21 is 28 mm. After applying the high frequency energy, there is applied to the low frequency electrodes 20 and 21 the high voltage low frequency current having a frequency of 60 cycles applied under a potential of approximately 2,000 volts, which immediately drops to 440 volts, the latter being accompanied by a current of 20 milliamperes. The high frequency energy thus corresponds with 5 watts, whereas the low frequency energy corresponds with 9 watts, the total being 14 watts, of which approximately 35% is high frequency energy.

The reaction products produced under the above conditions are absorbed by passing through silica gel as hereinafter set forth in detail, and the silica gel showed an increase in weight for a 6-minute run of 184.9 mg. of nitric oxide. This corresponds to a yield of 276.0 gms. of nitric acid per kilowatt hour. This yield appears on the graph of Fig. 5 as point R.

The following is an additional example, identified as Example II, setting forth the production of nitric oxide from atmospheric air using the reactor set forth in Fig. 1.

In starting the apparatus, the flow of dried air is initiated through the inlet member 26, said air passing through the reactor legs at a velocity of 510 cc. per minute, under standard conditions. The pressure within the reactor is maintained at approximately 334 mm. mercury pressure. There is applied to the high frequency electrode terminals 24 and 25 high frequency energy having a potential voltage, before striking, of approximately 1800 volts, said voltage dropping immediately on striking the discharge to 300 volts with a corresponding current of 16 milliamperes. The high frequency energy is applied at a frequency of 2.09 mc. (143.5 meters). The high frequency gap between the electrodes 24 and 25 is 16.5 mm. and the low frequency gap between the electrode terminals 20 and 21 is 28.5 mm. After applying the high frequency energy, there is applied to the low frequency electrodes 18 and 19 a high voltage low frequency current having a frequency of 60 cycles applied under a potential of approximately 2,000 volts, which immediately drops to 440 volts, the latter being accompanied by a current of 20 milliamperes. The high frequency energy thus corresponds with 5 watts whereas the low frequency energy corresponds with 9 watts, the total being 14 watts, of which approximately 35% is high frequency energy. The reaction products produced under the above conditions are absorbed by passing through silica gel, as hereinafter set forth in detail, and the silica gel showed an increase in weight for a 6-minute run of 180.6 mg. of nitric oxide. This corresponds to a yield of 270.9 grams of nitric acid per kilowatt hour. This yield appears on the graph of Fig. 5 as point S.

Additional runs were made in the reactor of Fig. 1, the electrode terminals all comprising a copper-lithium alloy having a 2% lithium present, at wave lengths varying between 90 and 170 meters and within this range there was found, as indicated in Fig. 5, the peak band T within which there was obtained a peak yield. This band ranged from about 120 to about 160 meters and more specifically from about 135 to 145 meters.

The graph of Fig. 5 was obtained by operating as in Examples I and II, the only significant factor varied being the frequency as measured in meters. Within the range of 90 to 170 meters, a run was made at intervals of 2 or 3 meters along the abscissa. The results of this series of experiments are plotted as the curve in Fig. 5.

It is desired to refer to the following:

The line M—N drawn through the low points is known as the base line. Having disclosed the present invention in a manner to comply with the patent statutes, without being limited as to theoretical considerations, it is here advanced, as believed, that the yield below the base line M—N is the result of purely thermal collisions as has heretofore been accepted as the general explanation of reactions in the electrical discharge, but that the reaction products produced within the area of the peak bands but above the base line M—N are due to activation of nitrogen by resonant absorption of energy, probably also of a collision variety. In other words, the total yields within the peak band ranges are the additive sum of the reaction produced by resonant activation. Further, the proportionate contribution of each of these at any specific wave length within a peak band range is the ratio of the fraction of the total ordinate that lies above the base line M—N and that fraction of the total ordinate which lies below the base line M—N.

It is desired to point out that the maximum yield of nitric oxide as shown on the graph of Fig. 5, said yield occurring when a high frequency wave length is used selected from the band lying between about 120 to 160 meters, and preferably between about 135 and 145 meters, is obtained with copper-lithium electrodes and under the conditions specified in Examples I and II, there being no cooling of the electrodes.

It may be pointed out that the copper-lithium alloy used in the examples herein set forth and from which the curve set forth in Fig. 5 was drafted analyzed approximately 98% copper and 2% lithium. It is not intended, however, to limit the scope of the present application to metal alloys containing only 2% lithium. Not only may copper alloys be used, but other alloys containing lithium, as, for example, nickel alloys, may be used in carrying out the present invention, one of the inventive thoughts of the present invention being to obtain the benefit of lithium in all alloys with which lithium will alloy. Not only may binary alloys containing lithium be used, but ternary alloys may be used, as, for example, a copper-calcium-lithium alloy, the calcium being present in the amount of 2% and lithium in the amount of 2%. Other prior art lithium alloys may be used. In general, the electrodes may be selected from the group consisting of a metal-containing material in which copper predominates, and a metal-containing material in which nickel predominates, the copper lithium and the nickel lithium alloys being preferred examples of the general class of electrode materials in which copper predominates and in which nickel predominates.

The air which is introduced into the reactor 1 is dried prior to its introduction into the reaction vessel by passing it through soda lime tubes A, Fig. 4, then through the silica gel tube B, thence through the conduit C, through the orifice D of the differential manometer E, through the valve F, and thence to the reactor 1. At the point H is connected the mercury manometer G which measures the internal pressure of the reactor. From the reactor 1 the exit gases pass through exit conduit 27 to a series of silica gel absorber tubes J, which tubes extract the nitric oxide content of the exit gases. A vacuum is applied by means of the vacuum pump K and the amount of vacuum adjusted by means of the release valve L and the main valve F in the supply line. The soda lime functions not only to take out a portion of the moisture but also to extract from the air substantially all of the carbon dioxide. The air as delivered to the reactor 1 has a moisture content of about 5 to 8 mg. of moisture per liter. When the run is started, the valves $V^2$ and P are closed and $V^1$ and O are open. When operation has reached equilibrium, valves $V^2$ and P are quickly opened and valves $V^1$ and O are closed, noting the time of doing so with a stop watch. Upon conclusion of the run, valves $V^1$ and O are opened, while $V^2$ and P are closed.

The time interval during which the valves $V^2$ and P are open to the absorbers and the valves $V^1$ and O of the by-pass are closed is six minutes. During this period the silica gel is absorbing the nitric oxide produced by the reaction. After the run is terminated, the silica gel tubes are weighed and the increase in weight taken as the weight of nitric oxide produced in the six minutes.

It is within the province of the present invention to use high frequency energy and currents varying from about 10,000 cycles to 300,000 mc. or over. This corresponds in wave lengths from 30,000 meters to 1 mm. or less. As a practical matter, when using the present crossed discharge apparatus and in practicing the method herein set forth, the invention finds its greatest field of usefulness when the high frequency energy is of the order of radio frequency, although, as pointed out, the invention may be used in connection with a much lower or higher frequency energy.

The low frequency energy or current may vary from the lowest producible frequency, including 10 to 25 cycles, to about 3,000 mc. This corresponds to a variation in wave length from about 30,000,000 meters for 10 cycles to 10 centimeters for 3,000 mc.

In co-pending application Serial No. 790,568, a continuation-in-part of application Serial No. 497,678, filed August 6, 1943, the latter of which is abandoned, it is pointed out that utilizing tantalum electrodes and the crossed electrical discharges, a certain peak yield of nitric acid per kilowatt hour is obtained. In accordance with the present invention, the peak yield set forth in said prior applications is notably increased.

It is also within the province of the present invention to cross high frequency energy with high frequency energy of the same or different wave lengths in a reactor of the type set forth in Fig. 1 or Fig. 8 or equivalent reactors, there being passed through the electrodes 18 and 19 of Fig. 1 high frequency energy instead of low frequency energy, the high frequency energies being of the character herein set forth.

Further, it is within the province of the present invention to cross a given high frequency energy with a second given high frequency energy, both first and second high frequency energies having quantum energies which produce peak yields. When wave lengths of this character producing peak yields are crossed, then the yield is substantially greater than the yield which is obtained by using the said first high frequency alone or using the second high frequency alone, or by crossing said first high frequency with itself or with a low frequency current; or by crossing said second high frequency with itself or with low frequency energy of the order of 10 cycles or 60 cycles to 10,000 cycles or 50,000 cycles, or 100,000 cycles.

It is desired to point out that in producing nitric oxide by subjecting a nitrogen-containing gas, such as air, or its equivalent, to the action of a crossed composite discharge, the energy contributed by the high frequency component is desirably 4% or more of the total energy supplied to both the low frequency and the high frequency discharges, and may vary between 4% and 65%. In some cases, the percentage of high frequency energy supplied during the reaction period may vary between 25% and 65%, and satisfactory results have been obtained when the percentage of the higher frequency energy approximates 35% of the total energy supplied to the composite discharge.

Any of the compounds herein set forth and many other compounds may be reacted, or any of the generic chemical reactions herein set forth may be caused to occur under the above conditions to greatly increase the yield. In short, the yield of any chemical compound may be increased by using a plurality of cyclic electrical energies in the presence of operative electrodes which contain lithium components, said electrical energies being preferably crossed to produce crossed electrical discharges, as herein set forth in detail, while at the same time increasing the percentage of high frequency energy supplied during the reaction to between 25% and 65% of the total energy supplied to the system.

It is desired to point out that by crossing low frequency and high frequency discharges, the volume of the composite discharge per unit of total energy supplied is greatly increased; that is, the energy density in watts per cubic centimeter is greatly decreased. Stated differently, the composite discharge fills a larger volume than does either discharge alone when supplied with energy equal to the total energy supplied to the crossed discharges.

As shown in Fig. 1 or Fig. 8, the crossed electrodes are all in the same plane, and said plane may be a vertical plane, a horizontal plane or any intermediate plane. It is within the province of the present invention in its broad aspects, to supplement the four electrodes, as shown in Fig. 1, or the three electrodes, as shown in Fig. 8, by an additional pair of low frequency electrodes. The additional pair of low frequency electrodes may have the same low energy frequency passing therethrough as that which passes through the electrodes 18 and 19 of Fig. 1; or the additional pair of electrodes may utilize the same frequency as that passing through the high frequency electrodes 22 and 23 of Fig. 1; or the additional pair of electrodes may use a lower frequency than that passing through the low frequency electrodes 18 and 19 of Fig. 1; or a frequency intermediate that passing through low frequency electrodes 18 and 19 of Fig. 1 and the high frequency electrodes 22 and 23 of Fig. 1.

While the yields herein set forth are for the production of nitric oxide in the presence of copper-lithium electrodes, the principles of the present invention may be used in other chemical reactions, as previously set forth. Aliphatic hydrocarbons may be treated in the apparatus herein set forth by passing a mixture of methane and air through the zone of crossed discharges. Pyridine is decomposed on the passage of same through the zone of crossed discharges to produce, among other compounds, aliphatic amines. Pyridine may be hydrogenated in the presence of hydrogen to produce piperidine. The lower members of the paraffin series, including methane, ethane, propane, butane and pentane, when passed through the crossed discharges of the character herein set forth, are dehydrogenated to yield mixtures of aldehydes and unsaturated hydrocarbons in varying proportions, depending on the raw material used and the conditions of operation, said unsaturated hydrocarbons including ethylene, acetylene, and butene.

It is within the province of the present invention to carry out the reactions, herein set forth using sub-atmospheric pressure, atmospheric pressure or super-atmospheric pressure.

In producing nitric oxide, the air may be enriched with oxygen, and, within limits, the yield will be somewhat increased over the yield of nitric oxide produced when only air is electrically transformed in accordance with the present invention. Air may be so enriched so that it has up to 50% of oxygen, and when so enriched this enrichment will produce an increase in yield of nitric oxide of about 10%.

Fig. 6 sets forth the hook-up of the high frequency generator unit used for producing the high frequency energy supplied to the tank circuit connecting the generator to the reactor. The diagram may be divided into four circuits 32, 33, 34, and 35. Circuit 32 is the full wave rectification unit wherein the leads 36 connect to the 110-volt 60-cycle supply on the panel board. The numeral 37 identifies a transformer delivering its secondary high voltage current to the two rectification tubes 38, the filaments of which are heated by current generated in the filament transformer 39. The resistor 41 and fixed condenser 42, together with the choke coil 40, constitute a filter. The high voltage D. C. current produced by this circuit leaves same by means of the ground connection 43 and the lead 44, which delivers to the plates of tubes 45 and 46 of the oscillator circuit. The transformer 47, connected with 110-volt supply, provides the filament power for the tubes 45 and 46. The desired frequency is obtained by means of tuning the oscillator circuit 33, such tuning being effected by operation of the variable condenser 48 and the inductance 49.

In carrying out the work described as above set forth between the limits of wave length of 20 meters or 15 mc., and 175 to 180 meters or 1.71 to 1.66 mc., it is necessary to change the size of the inductance 49 by steps. This is done by removing one inductance and replacing same with another inductance having the desired characteristics. The minor circuit 50 is a coupling circuit, coupling the oscillator circuit 33 to the grid input circuit 51 of the power amplifier circuit 34. The grid circuit of the power amplifier is tuned by means of the variable condenser and by changing inductance coils 51 in a manner similar to the change effected in inductance 49, as necessary to meet requirements. The combination of resistor 53 and condenser 54, both of which are grounded, serves to minimize or eliminate parasitic oscillations that might render the output less monochromatic. The resistor 55 provides grid bias for the power amplifier tubes 56 and 57. These tubes amplify power provided by circuit 35, imparting thereto the frequency developed by oscillator tubes 45 and 46. Transformer 59, connected with a 110-volt supply, provides the power for the filaments of tubes 60 and 61. It will be observed that circuit 35 is essentially similar to circuit 32. The combination of the choke 63, fixed condenser 64, and resistor 65 constitutes a filter. The rectified power leaves the circuit via the milliammeter 66 to ground and lead 67 to the power amplifier circuit 34. The voltage at which it is delivered is measured by the voltmeter 68. The power amplifier circuit 34 is tuned to the desired frequency as generated by means of oscillator tubes 45 and 46 of oscillator circuit 33 by means of the variable condenser 69 and the inductance 70. The inductance 70 is varied by means of changing coils to meet various wave length requirements as is done in the case of inductances 49 and 51. The power amplifier circuit 34 thus tuned and supplied by D. C. power from circuit 35 transmits the amplified high frequency energy to the coupling circuit 71, which in turn delivers it to a tank circuit, such as shown in Fig. 7.

Fig. 7 represents a tank circuit of the type known as end grounded. The portion of the coupling circuit shown as 72 leads to and is a part of the coupling circuit 71 of Fig. 6 and is placed at the end of the inductance 73. It will be noted that in this type of tank circuit the ground 74 is at the end of the tank coil 73 instead of in the middle 75, as would be the case had the tank circuit been of the center grounded type. The coupling circuit 71—72 serves merely to transfer the high frequency energy from the generator set to the tank circuit proper. The point 76 is the location of the discharge. Tuning of this tank circuit to the generator circuit is carried out by use of the variable condenser 77 and by changing inductance coil 73 as was done with inductances 70, 51 and 49 to meet requirements. The circuit conductors 78 are preferably of copper tubing. A thermomilliammeter is located at 79 and a high frequency voltmeter at 80. The circuit is grounded at 74.

The reactor unit shown in Fig. 8 comprises a reactor vessel 81 provided with horizontally extending members 82 and 83 and vertically extending tube-like members 84 and 85, the latter projecting from the spherical member 86. Extending through the horizontal member 82 is a sheath-like member 87 which is mounted in an insulating closure member 88. Projecting within the sheath member 87 is a low frequency electrode 89, the latter being mounted in an insulating closure member 90, which also acts as a closure for the member 87. The electrode 91 is a high frequency hot terminal electrode. Projecting through the reactor member 85 is an electrode 93, the latter being mounted in an insulating closure member 94. The electrode 93 is the ground electrode for both the high frequency circuit and the low frequency circuit, serving as a common ground. The low frequency electrode 89 is connected by means of the wire 101 to the low frequency generator 100 which is grounded through the wire 102. The high frequency electrode 91 is connected by the wire 99 to the high frequency generator 98. The common ground electrode 93 is grounded through the wire 103.

The gaseous medium enters through the inlet conduit 95 which is centrally mounted in the reactor member 83, the latter being provided with a closure member 96. It is to be noted that the inlet member 95 preferably extends well into the discharge volume in order to insure intimate contact of the entering gaseous medium with the composite or crossed discharge. The reacted gaseous product passes first through the reactor sheath 87 and then leaves the reactor by the exit conduit 97. Both the high frequency electrodes and the low frequency electrodes may consist of any of the metals or alloys herein set forth or equivalents known in the art. The high frequency gap may vary between 15 and 25 mm. and the gap between the low frequency electrode and the ground electrode may also vary between 15 and 25 mm. Obviously, this gap may vary according to operating conditions. Instead of arranging the electrodes as shown in Fig. 8, any of the three electrodes may be the ground electrode and the other two electrodes respectively become the high frequency electrode and the low frequency electrode, and these may be interchanged so that either one is the high frequency or the low frequency electrode.

It is desired to point out that the electrode tip 89a projects beyond the end 87a of the sheath. Under some circumstances, this is a desirable construction, as this insures that the tip of the low frequency electrode is not subjected to the influence of any volatile constituents emanating from the interior wall of the sheath 87. If the sheath is made of glass, it may emit active constituents, which may be sodium vapor or sodium ions. There is a tendency for the results to be non-uniform if the tip 89a is enclosed within the glass sheath. While it is stated that sodium may be responsible for this non-uniformity, it may be caused by other constituents of the glass.

In the example set forth, the rate of flow of air through the reactor is about 500 cc. per minute. It is important, in connection with the rate of air passing through the reactor vessel, to supply sufficient air per minute, so that the maximum yield for the frequency used may be obtained. This means that, operating with different high frequencies, varying minimum rates of flow are desirable in accordance with the frequency used. When the crossed discharge method is used to electrically transform products, the rate of flow of the material which is flowing through the reactor, which is to be transformed, must be greatly increased for frequencies corresponding with peak yields; and the rate of flow of about 500 cc. per minute represents the proper accelerated rate of flow of the air through the reactor to provide peak yields at the preferred peak frequency bands herein set forth.

The electrical discharge in the reactors set forth in the drawings may be of the glow or corona type. If the pressure at which the reaction is carried out is above about one-half an atmosphere, the discharge tends to be a corona discharge, but at pressures below about one-half an atmosphere, characteristics of a glow discharge begin to become apparent and become increasingly pronounced as the pressure decreases. This pressure may be decreased until it approaches a vacuum as a lower limit. When using crossed discharges, the discharge frequency partakes of the character of both a glow and a corona discharge. By properly adjusting the frequency for a particular medium which is being chemically transformed, the reactors herein set forth using crossed discharges may be operated to give either a glow or a corona discharge above about one-half an atmosphere or to give either a glow or corona discharge below about one-half an atmosphere.

By "glow discharge" is meant a discharge which consists of a soft diffusion of light throughout the entire volume of space between the electrodes. This may be, although not necessarily, simultaneously accompanied by an almost complete lack of incandescence of the electrodes themselves. The glow discharge does not have a definite boundary, as is characteristic of the corona discharge. The glow is not usually of uniform intensity through the volume between the electrodes, the intensity being greater along the axis between the electrodes and tapering off gradually to the confined of the reactor tube.

If the energy supply be increased, the electrodes will become incandescent without appreciably effecting the glow characteristics of the discharge.

While the cyclic energy is stated to be supplied to the high frequency electrodes at a voltage of about 800 volts and to the low frequency electrodes at about 1100 volts, it is desired to point out that this is merely illustrative and is not by way of limitation, as the voltages of the respective cyclic energies will vary in accordance with a number of conditions, including the length of the discharge desired, the pressure used, the composition of the fluid or gas being reacted, and the composition of the electrodes utilized in carrying out the invention. The voltage may be as much as 25,000 volts, but in a fairly good-sized reactor capable of at least semi-commercial exploitation, the voltages of both frequencies will vary from 5000 to 10,000 volts and preferably from 5000 to 7000 volts, and in that case the gap between the electrodes may be in the neighborhood of 5 to 10 inches, and preferably 5 to 7 inches. Here again these figures are merely illustrative and are set forth to indicate that the voltage may be varied over wide limits depending upon the conditions of operation.

By "radio frequency," as used above, is meant a frequency ranging from about 30,000 cycles per second to 600 mc. and more, usually 500,000 cycles to 60 mc.

Instead of employing the reactor set forth in Fig. 1, the reactor may be of the character disclosed in Fig. 8, wherein the reactor is provided with crossed electrodes, one of said electrodes being a common ground electrode through which both of the crossed discharges pass to ground. A reactor of this character may be provided with low frequency copper-lithium, nickel-lithium, or other lithium alloy electrodes, and the common electrode may be of the same alloy material, or of a different alloy material, or all of the electrodes may comprise copper-lithium alloys of the character herein set forth, or nickel-lithium alloys.

It is also within the province of the present invention to utilize a reactor of the character set forth in co-pending application Serial Number 485,058, now Patent No. 2,468,173, wherein an external electrode is provided.

In the preferred form of the invention, a chemical material is reacted in the presence of crossed electrical discharges of different frequencies. It is within the province of the present invention to produce chemical compounds by electrically transforming a chemical material in the presence of a plurality of electrical discharges of different frequencies, as, for example, one frequency being 60 cycles to 50,000 cycles per second, and the other frequency being substantially over 10,000 cycles, as, for example, 1,000,000 cycles (1 mc.) to 12,000,000 cycles (12 mc.). The higher frequency may be a radio frequency. Both frequencies may be of the order of radio frequency. Not only can chemical compounds broadly be transformed in accordance with the above, but a nitrogen-and-oxygen-containing medium may be subjected to a plurality of electrical discharges of the character above indicated and broadly indicated elsewhere in the present specification, to thereby produce nitrogen oxide.

In carrying out the present invention, all or any of the electrodes may be of nickel, brass, a brass lithium alloy, copper, a copper lithium alloy, tungsten or columbium, iron, chromium, nickel chromium alloys, silver, platinum, platinum alloys and the like. However, most desirably, the electrodes or electrode terminals are made of an alloy of copper and lithium, as, for example, 98% copper and 2% lithium. Obviously, the lithium may vary considerably as, for example, any or all of the electrodes may be made from an alloy consisting of 96% copper and 4% lithium. The lithium content may be less than 4% or 2% and may vary from 0.2% to 4%, the balance of the alloy being copper or brass or nickel.

While, preferably, in carrying out the present invention in all of its forms, it is desirable to use an alloy of copper and lithium, it is recognized that a very active component of the alloy is lithium, and therefore lithium may be combined with other metals with which it will alloy as, for example, nickel.

It has been pointed out in prior applications that increased yields are obtained using nickel electrodes or electrode terminals when the electrodes are crossed and different frequencies are applied to said electrodes. It is known that nickel has a critical electrode frequency and that, when a nitrogen-and-oxygen containing medium is supplied to a reactor provided with a single set of nickel electrodes and a high frequency current is passed therethrough corresponding to the critical electrode frequency, that increased yields are obtained. The introduction of lithium into the nickel or nickel alloy functions to again pyramid the yield. While, as shown in the drawing, each electrode is perpendicular to the other electrode and the set of low frequency electrodes is perpendicular to the set of high frequency electrodes, each electrode may be positioned at any other angle to an adjusted electrode, and the set of high frequency electrodes may be positioned at an angle to the set of low frequency electrodes.

The gaseous medium may be electrically reacted or electro-chemically transformed while under pressure between about 150 mm. of mercury and about 725.0 mm. of mercury. The optimum operating range is between about 320 mm. or 325 mm. and about 360 mm. or 365 mm. of mercury.

In carrying out the present invention sufficient air per minute should be supplied to the reactor vessel so that the maximum yield for the frequency used may be obtained. It may be pointed out that general considerations governing the flow of material being electrically transformed are set forth in application Serial No. 483,931, filed April 21, 1943, now abandoned.

Referring to Fig. 9 there is diagrammatically illustrated the volume of the luminous discharge formed when using uncrossed discharges, the discharge volume D representing the discharge produced by subjecting the gas, such as a mixture of nitrogen and oxygen in which the nitrogen predominates, to the action of low frequency energy typified by 60 cycles. Using non-critical high frequency between the limits of about 2.5 mc. (120 meters) and about 1.875 mc. (160 meters), the volume of the luminous discharge between the electrodes increases as illustrated by the discharge volume E of Fig. 9. These discharge volumes are produced, of course, by using the frequencies recited alone, that is, not crossed by another frequency. If the discharge is generated by a peak frequency, as, for example, a discharge between 135 and 145 meters, the volume of the discharge between the electrodes will be still further increased and this volume is diagrammatically indicated by the discharge volume F.

Referring to Fig. 10, this figure diagrammatically illustrates what happens to the volume of discharge when two frequencies are crossed. The discharge volume G set forth in Fig. 10 is bounded by the lines $g^1, g^2, g^3$ and $g^4$. This discharge volume is obtained by crossing 60 cycles with a non-critical reaction frequency, as, for example, 120 meters, or 160 meters. The discharge volume G is therefore greater than the discharge volume D, or the discharge volume E, when the total energy supplied to the crossed discharge is the same as the electrical energy supplied to produce discharge D or E. The above statement means, from the standpoint of energy density, that the energy density, i. e. volt-amperes per cubic centimeter, continuously decreases in passing from the operating conditions of D to the conditions of E, to the conditions of F and then to the conditions of G, a power factor of 1.0 being assumed. The crossing of the discharges in all cases decreases the energy density of the discharge volume, or inversely, increases the volume of the discharge, or both. The above indicates that the crossing is highly advantageous. Further, the best results are obtained when there is a substantial difference in frequency energy, wave length, or energy quantum between the higher frequency energy and the lower frequency energy. When the difference between the energy components is at least 65,000 cycles per second, the increase in yield becomes significantly apparent, and at a difference of 100,000 cycles per second, as set forth in application Serial No. 546,882, filed July 27, 1944, the increase in yield is noticeable, and at a difference of 200,000 cycles per second, as set forth in application Serial No. 553,426, filed September 9, 1944, the yield is further increased. As the difference in energy quantum or frequency increases between the higher frequency energy or current and the lower frequency energy or current, more advantageous yields are produced by the crossing of the discharges. The energy density may be measured in watts per cubic centimeter or joules per cubic inch.

It is well known that a specific sinusoidal wave or frequency has a definite energy quantum content, and that, given the particular frequency or particular wave length employed, the energy quantum or the energy content thereof may be easily obtained.

In order to convert a given frequency into its equivalent quantum energy, all that is necessary is to multiply the given frequency by Planck's constant, which is $6.554 \times 10^{-27}$ erg-seconds.

The relationship between energy quantum expressed in ergs, frequency, and wave length is set forth by the following formula:

$$E \text{ (ergs)} = hf = \frac{k}{\lambda}$$

where $k = 1.967 \times 10^{-18}$
$h$ = Planck's constant
$f$ = frequency
$\lambda$ = wave length in meters said interrelationship being well known in the literature, and is also set forth in said co-pending application Serial No. 790,568.

The constant "$k$" is merely the quantum energy of 300 mc. (1 meter) sinusoidal wave and is obtained in the usual manner by multiplying Planck's constant ($6.554 \times 10^{-27}$) by 300 mc. ($3 \times 10^8$), the resulting figures being $1.967 \times 10^{-18}$.

The present invention is also directed to a method of producing nitrogen oxide comprising introducing a gaseous medium consisting principally of nitrogen gas and oxygen gas into a gas discharge apparatus provided with a plurality of at least three separately spaced electrodes having metallic electrode terminals disposed therein to supply the apparatus with a plurality of cyclic electrical discharges differing in energy quantum, two of said terminals being high frequency terminals, and subjecting said gaseous medium while under a pressure between about 320 millimeters of mercury and about 360 millimeters of mercury to the action of a composite cyclic electrical discharge produced by the intersection of a plurality of cyclic electrical discharges differing in energy quantum, each of said discharges emanating from a separate electrode and electrode terminal, one of said discharges being generated by a cyclic energy quantum equivalent to a sinusoidal frequency between about 2.5 mc. (120 meters) and about 1.875 mc. (160 meters), the other discharge being generated by cyclic energy quantum equivalent to a sinusoidal frequency between about 10 cycles per second (30,000,000 meters) and about 50,000 cycles per second (6,000 meters). This method is effected in the presence of electrodes or electrode terminals selected from the group consisting of a metal-containing material in which copper predominates, and a metal-containing material in which nickel predominates.

In accordance with the present invention, the gaseous medium may be subjected, while under a pressure between about 150 milliammeters of mercury and about 725 milliammeters of mercury, to the action of a composite cyclic electrical discharge produced by the intersection of a plurality of separate cyclic electrical discharges differing in energy quantum, each of said discharges emanating from a separate high potential terminal, one of said discharges being generated by the cyclic energy quantum equivalent to a sinusoidal frequency between about 2.50 mc. (120 meters) and about 1.875 mc. (160 meters).

It is desirable to operate the cross discharge method and apparatus at minimum sustaining energy. By "minimum sustaining energy" is meant that amount of energy, preferably supplied in approximately equal amounts by each of the two contributing frequencies, that will just sustain the discharge. If amounts of energy in excess of the minimum sustaining energy are used, the excess electrical energy is converted, not into chemical energy to do useful work, but is wasted by conversion into heat energy, the production of which in turn tends to decompose the product already formed. Operation above minimum sustaining energy tends to reduce yield. It is clear that, while it is desirable from many standpoints to operate at minimum sustaining energy, it is not absolutely necessary to operate at minimum sustaining energy, the process being entirely operative at or above minimum sustaining energy. In starting the discharge with more than minimum sustaining energy, the discharge may be adjusted to minimum sustaining energy by gradually decreasing the total energy supplied as long as the yield per unit energy increases. When the yield ceases to increase with further reduction of energy supplied, and it may even start to decrease, then, the point of minimum sustaining energy has just been passed.

Referring to Fig. 5 of the drawing, excellent yields are obtained between the limits of 135 and 145 meters. It is also clear that good yield is obtained working lower down on the flanks of the curve as, for example, at 125 meters or 130 meters, or at 150 meters or 155 meters, all these being within the range of between 120 meters and 160 meters.

The present application is a continuation-in-part of the following applications: S. N. 483,931, filed April 21, 1943 (now abandoned); 501,478, filed September 7, 1943 (now abandoned); 526,933, filed March 17, 1944 (now abandoned); 546,882, filed July 27, 1944; 553,426, filed September 9, 1944; 779,561, filed October 13, 1947; and 790,568, filed December 9, 1947.

The method of producing nitrogen oxide in which there is employed, irrespective of the electrode materials utilized, a sinusoidal frequency within the range of about 2.50 mc. (120 meters) and about 1.875 mc. (160 meters) or the more narrow frequency ranges of about 2.19 mc. (137 meters) or 2.22 mc. (135 meters) and 2.07 mc. (145 meters) or 2.04 mc. (147 meters), is claimed in applicant's co-pending application 553,426, filed September 9, 1944. The production of nitrogen oxide utilizing cross discharges broadly is claimed in co-pending application Serial No. 546,882, filed July 27, 1944.

Certain forms of the apparatus herein set forth are claimed in Patents Nos. 2,468,173, 2,468,174 and 2,468,175, granted April 26, 1949.

What is claimed is:

1. The method of producing nitrogen oxide comprising introducing into a reactor a nitrogen-and-oxygen-containing medium which produces nitrogen oxide upon treatment with crossed electrical discharges, said reactor being provided with a plurality of separately spaced electrode terminals adapted to generate cyclic electrical discharges which cross each other, at least one of said terminals comprising a lithium alloy selected from the group consisting of a nickel-lithium alloy in which the nickel predominates, and a copper-lithium alloy in which copper predominates, and subjecting said medium to a plurality of electrical discharges which cross each other and which emanate from said separately spaced electrodes, one of said discharges being generated by a cyclic energy quantum equivalent to a sinusoidal frequency between about 2.50 mc. (120 meters) and about 1.875 mc. (160 meters), and the other discharge being generated by a cyclic energy quantum equivalent to a sinusoidal frequency between about 10 cycles per second (30,000,000 meters) and about 50,000 cycles per second (6,000 meters).

2. The method of producing nitrogen oxide comprising introducing into a reactor a nitrogen-and-oxygen-containing gaseous medium which produces nitrogen oxide upon treatment with crossed electrical discharges, said reactor being provided with a plurality of separately spaced electrode terminals, adapted to generate cyclic electrical discharges which cross each other, at least one of said terminals comprising a copper-lithium alloy in which copper predominates, and subjecting said medium to a plurality of electrical discharges which cross each other and which emanate from said separately spaced electrodes, one of said discharges being generated by a cyclic energy quantum equivalent to a sinusoidal frequency between about 2.50 mc. (120 meters) and about 1.875 mc. (160 meters), and the other discharge being generated by a cyclic energy quantum equivalent to a sinusoidal frequency between about 10 cycles per second (30,000,000 meters) and about 50,000 cycles per second (6,000 meters).

3. The method of producing nitrogen oxide comprising introducing into a reactor a nitrogen-and-oxygen-containing gaseous medium which produces nitrogen oxide upon treatment with crossed electrical discharges, said reactor being provided with a plurality of separately spaced electrode terminals, adapted to generate cyclic electrical discharges which cross each other, at least one of said terminals comprising a copper-lithium alloy in which copper predominates, and simultaneously subjecting said gaseous medium to a plurality of electrical discharges emanating from said separately spaced electrodes supplied by separate sources of cyclic energy, said cyclic electrical discharges crossing each other to define a visible composite discharge having a volume larger than the volume of either discharge alone when the energy to generate either of said discharges is equal to the total energy supplied to the crossed discharges, one of said discharges being generated by a cyclic energy quantum equivalent to a sinusoidal frequency between about 2.50 mc. (120 meters) and about 1.875 mc. (160 meters), and the other discharge being generated by a cyclic energy quantum equivalent to a sinusoidal frequency between about 10 cycles per second (3,000,000 meters) and about 50,000 cycles per second (6,000 meters).

4. The method of producing nitrogen oxide comprising introducing into a reactor provided with separately spaced metallic electrodes adapted to generate cyclic electrical discharges which cross each other, a nitrogen-and-oxygen-containing gaseous medium which produces nitrogen oxide upon treatment with crossed electrical discharges, said electrodes being selected from the group consisting of a metal-containing material in which copper predominates, and a metal-containing material in which nickel predominates, and subjecting said gaseous medium to a plurality of electrical discharges of different energy quantum and which emanate from said sepaartely spaced electrodes supplied by separate sources of cyclic energy, said cyclic electrical discharges crossing each other to define a visible composite volume larger than the volume of either discharge alone when the energy to generate either of said discharges is equal to a total energy supplied to the crossed discharges, one of said discharges being generated by a cyclic energy quantum equivalent to a sinusoidal frequency between about 2.50 mc. (120 meters) and about 1.875 mc. (160 meters).

5. The method of producing nitrogen oxide comprising introducing a gaseous medium consisting principally of oxygen gas and nitrogen gas into a gas discharge apparatus including a reactor provided with a plurality of spaced metallic electrodes disposed therein to supply the reactor with a plurality of cyclic electrical discharges having different energy quanta, said electrodes being selected from the group consisting of a metal-containing material in which copper predominates and a metal containing material in which nickel predominates, and subjecting said gaseous medium in the presence of said electrodes to the action of a composite luminous electrical discharge produced by the intersection of two separate cyclic electrical discharges of different energy quantum, one of said discharges being generated by a cyclic energy quantum equivalent to a sinusoidal frequency between about 2.22 mc. (135 meters) and about 2.07 mc. (145 meters) said frequency band being a critical frequency for activating the nitrogen-and-oxygen-containing medium which is being reacted, and the other of said discharges being generated by a cyclic energy quantum equivalent to a sinusoidal frequency between about 10 cycles (30,000,000 meters) and about 10,000 cycles (30,000 meters).

6. The method of producing nitrogen oxide comprising introducing a gaseous medium consisting principally of oxygen gas and nitrogen gas into a gas discharge apparatus including a reactor provided with a plurality of spaced metallic electrodes disposed therein to supply the reactor with a plurality of cyclic electrical discharges having different energy quanta, said electrodes being selected from the group consisting of a metal-containing material in which copper predominates and a metal-containing material in which nickel predominates, and subjecting said gaseous medium in the presence of said electrodes to the action of a composite luminous electrical discharge produced by the intersection of two separate cyclic electrical discharges of different energy quantum, one of said discharges being generated by a cyclic energy quantum equivalent to a sinusoidal frequency between about 2.22 mc. (135 meters) and about 2.07 mc. (145 meters), said frequency band being a critical frequency for activating the nitrogen-and-oxygen-containing medium which is being reacted.

7. The method of producing nitrogen oxide comprising introducing a gaseous medium consisting principally of oxygen gas and nitrogen gas into a gas discharge apparatus including a reactor provided with a plurality of spaced metallic electrodes disposed therein to supply the reactor with a plurality of cyclic electrical discharges having different energy quanta, said electrodes being selected from the group consisting of a metal-containing material in which copper predominates and a metal-containing material in which nickel predominates, and subjecting said gaseous medium in the presence of said electrodes to the action of a composite luminous electrical discharge produced by the intersection of two separate cyclic electrical discharges of different energy quantum, one of said discharges being generated by a cyclic energy quantum equivalent to a sinusoidal frequency between about 2.22 mc. (135 meters) and about 2.07 mc. (145 meters) said frequency band being a critical frequency for activating the nitrogen-and-oxygen-containing medium which is being reacted, the total amount of energy contributed by the critical frequency band component being at least 4% of the total energy generating said composite luminous electrical discharge.

8. The method of producing nitrogen oxide comprising introducing a gaseous medium consisting principally of oxygen gas and nitrogen gas into a gas discharge apparatus including a reactor provided with a plurality of pairs of spaced metallic electrodes, the extended axis between one pair of electrodes intersecting the extended axis between another pair of electrodes to thereby supply the reactor with a plurality of cyclic electrical discharges having different energy quanta, said electrodes being selected from the group consisting of a metal-containing material in which copper predominates, and a metal-containing material in which nickel predominates, and subjecting said gaseous medium in the presence of said electrodes to the action of a composite luminous electrical discharge produced by the intersection of two separate cyclic electrical discharges of different energy quantum, one of said discharges being generated by a cyclic energy quantum equivalent to a sinusoidal frequency between about 2.22 mc. (135 meters) and about 2.07 mc. (145 meters), said frequency band being a critical frequency for activating the nitrogen-and-oxygen-containing medium which is being reacted, and the other of said discharges being generated by a cyclic energy quantum equivalent to a sinusoidal frequency between about 10 cycles (30,000,000 meters) and about 10,000 cycles (30,000 meters).

9. The method of claim 5 in which a copper base electrode material is employed.

10. The method of claim 5 in which a nickel base electrode material is employed.

11. The method of claim 6 in which a copper base electrode material is employed.

12. The method of claim 6 in which a nickel base electrode material is employed.

13. The method of claim 6 wherein the electrode material employed is an alloy comprising copper lithium in which copper predominates.

14. The method of claim 6 wherein the electrode material is alloyed with lithium.

15. The method of producing nitrogen oxide comprising introducing a gaseous medium consisting principally of oxygen gas and nitrogen gas into a gas discharge apparatus including a reactor provided with a plurality of spaced metallic electrodes disposed therein to supply the reactor with a plurality of cyclic electrical discharges having different energy quanta, said electrodes being selected from the group consisting of a metal-containing material in which copper predominates and a metal-containing material in which nickel predominates, and subjecting said gaseous medium in the presence of said electrodes to the action of a composite luminous electrical discharge produced by the intersection of two separate cyclic electrical discharges of different energy quantum, one of said discharges being generated by a cyclic energy quantum equivalent to a sinusoidal frequency between about 2.22 mc. (135 meters) and about 2.07 mc. (145 meters), said frequency band being a critical frequency for activating the nitrogen-and-oxygen-containing medium which is being reacted, the reaction being carried out with approximately minimum sustaining energy, said discharges differing in energy quantum by at least 0.065 of the energy quantum present in a sinusoidal wave of 1 mc. frequency.

WILLIAM J. COTTON.

REFERENCES CITED

The following references are of record in the file of this patent:

UNITED STATES PATENTS

| Number | Name | Date |
|---|---|---|
| 938,316 | Haber et al. | Oct. 26, 1909 |
| 1,601,500 | Island | Sept. 28, 1926 |
| 1,992,566 | Briner | Feb. 26, 1935 |
| 2,089,966 | Kassner | Aug. 17, 1937 |
| 2,106,780 | Whittier | Feb. 1, 1938 |

FOREIGN PATENTS

| Number | Country | Date |
|---|---|---|
| 315,367 | Great Britain | 1930 |
| 184,871 | Switzerland | 1936 |

OTHER REFERENCES

Comptes Rendus de l'academie des Sciences de l'U. R. S. S., 1938, vol. 20, No. 4, pp. 299–300. (An article by Motchalov.)